United States Patent [19]

Furuta et al.

[11] Patent Number: 5,105,721
[45] Date of Patent: Apr. 21, 1992

[54] BRAKE BOOSTER

[75] Inventors: Yoichi Furuta, Chiryu; Akira Shirai, Toyoake; Satoshi Kawasumi, Takahama, all of Japan

[73] Assignee: Aisin Seiki Kabushiki Kaisha, Kariya, Japan

[21] Appl. No.: 589,023

[22] Filed: Sep. 27, 1990

[30] Foreign Application Priority Data

Sep. 27, 1989 [JP] Japan .................................. 1-251609

[51] Int. Cl.$^5$ .................................................. F15B 9/10
[52] U.S. Cl. .................................. 91/374; 91/376 R; 91/377; 91/443
[58] Field of Search ............... 91/374, 369.1, 369.2, 91/369.3, 369.4, 376 R, 368, 370, 371, 373, 377, 443, 533; 92/49

[56] References Cited

U.S. PATENT DOCUMENTS

| | | | |
|---|---|---|---|
| 3,289,547 | 12/1966 | Kytta | 91/369.2 X |
| 3,517,588 | 6/1970 | Kytta | 91/369.2 |
| 3,923,427 | 12/1975 | Uyeda | 92/49 X |
| 4,147,179 | 4/1979 | Miura | 91/443 X |
| 4,494,445 | 1/1985 | Furuta et al. | 91/376 R X |
| 4,882,980 | 11/1989 | Arino et al. | 91/369.2 X |
| 4,967,644 | 11/1990 | Ellenberler | 91/374 |
| 4,979,426 | 12/1990 | Schiel et al. | 91/369.1 |

FOREIGN PATENT DOCUMENTS 0151028 8/1985 European Pat. Off. .
1139053 1/1969 United Kingdom .

*Primary Examiner*—Edward K. Look
*Assistant Examiner*—Todd Mattingly
*Attorney, Agent, or Firm*—Burns, Doane, Swecker & Mathis

[57] ABSTRACT

A brake booster includes a housing in which a constant-pressure chamber and a variable-pressure chamber are defined by a power piston. An input rod is operatively connected to one end of the power piston and receives an input force. A valve is provided in the power piston and operatively connected to the input piston so as to open upon receipt of the input force in such a manner that the differential pressure between the chambers moves the power piston. An output rod is operatively connected to the other end of the power piston. A wall member is provided across which a first auxiliary chamber at a side of the variable-pressure chamber and a second auxiliary chamber formed at a slide of the constant pressure are formed. An orifice passage connects the variable pressure chamber and the first auxiliary chamber.

5 Claims, 2 Drawing Sheets

BRAKE BOOSTER

BACKGROUND OF THE INVENTION

1. Field of the invention

The present invention relates to a brake booster and in particular to a booster to be connected to a master cylinder of a vehicle brake system.

2. Description of the Related Art

Japanese Utility Model Laid-Open Patent No. 60-30871, published without examination in 1985, discloses a booster having a housing in which a constant-pressure chamber and a variable-pressure chamber are defined by a power piston. An input rod receives an input force from a brake pedal and is operatively connected to one end of the power piston. A valve is provided in the power piston and is operatively connected to the input rod so as to open upon receipt of the input force in such a manner that a differential pressure between the chambers moves the power piston. An output rod is operatively connected to the other end of the power piston for actuating a master cylinder.

In the above-described booster, when a driver of the vehicle depresses a brake pedal, an input force F1 is applied to the input rod. The force is increased due to the well-known function of the booster and a resulting force is transmitted as an output force F2 of the booster to the master cylinder for the actuation thereof via the output rod.

However, in the above-described booster, the output force F2 is increased to a greater degree than that of the input force F1 (cf. FIG. 2). Accordingly, if the input force F1 is set at a predetermined value, the output force F2 is also at a value corresponding to the value of the force F1. Accordingly, an insufficient braking force is felt by the driver due to a decrease in the coefficient of friction ($\mu$) of a brake-pad against a rotor or drum.

SUMMARY OF THE PRESENT INVENTION

It is an object or the present invention to provide a brake booster without the foregoing drawback.

It is an another object of the present invention to provide a brake booster in which the output force can be increased while the input force is retained at set value.

The foregoing objects are attained by a brake booster of the present invention having a housing in which a constant-pressure chamber and a variable-pressure chamber are defined by a power piston. An input rod is operatively connected to one end of the power piston and receives an input force. A valve is provided in the power piston and is operatively connected to the input piston so as to open upon receipt of the input force therefrom in such a manner that the differential pressure between the chambers moves the power piston. An output rod is operatively connected to the other end of the power piston. A wall is provided between a first auxiliary chamber at a side of the variable-pressure chamber and a second auxiliary chamber formed at a side of the constant-pressure chamber and an orifice passage connects the variable-pressure chamber and the first auxiliary chamber.

BRIEF DESCRIPTION OF THE DRAWINGS

These and other objects, features and advantages of the present invention will become fully apparent on reading the following detailed description with reference to the accompanying drawings. wherein like members bear like reference numerals, and wherein.

DETAILED DESCRIPTION OF PREFERRED EMBODIMENTS OF THE INVENTION

Figure 1:
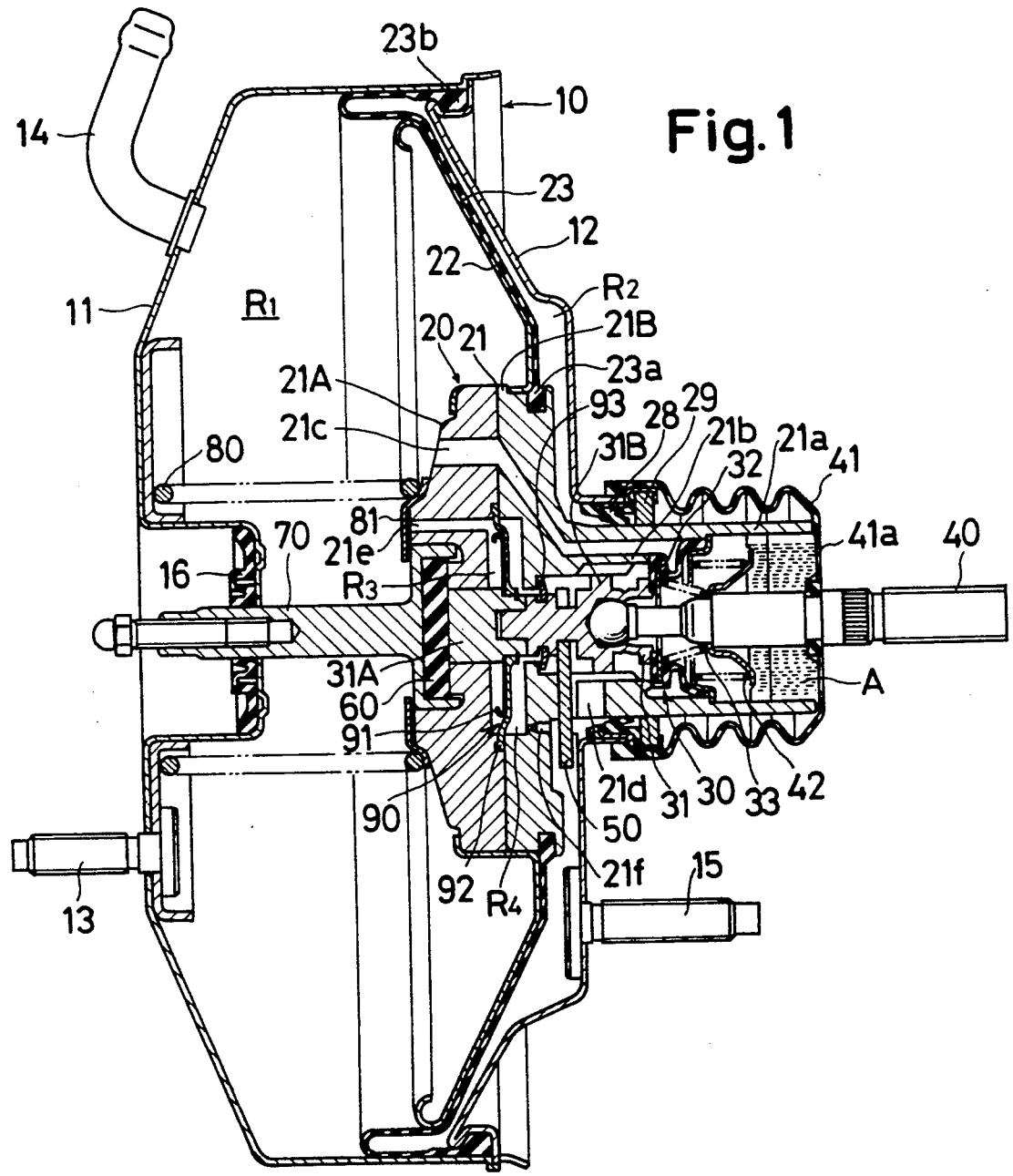
FIG. 1 is a cross-sectional view of a booster according to an embodiment of the present invention.

Referring now to FIG. 1 in which a booster of negative-pressure type is shown, a housing 10 of the booster includes a cup-shaped front shell 11 which is connected to a master cylinder (not shown) by a bolt 13. A plate shaped rear shell 12 is connected to the vehicle by a bolt 15. The front shell 11 has also a connector conduit 14 which is in fluid communication with an intake manifold (not shown). Within the housing 10, there is defined a constant-pressure chamber R1 of negative pressure and a variable-pressure chamber R2, separated by a power piston 20.

The power piston 20 has a hub 21 made of synthetic resin, an annular plate 22 and a diaphragm 23. The hub 21, which accommodates therein a valve 30, has a cylindrical portion 21a extending from the housing 10 through a sealing member 28 and a bushing member 29. The plate 22 and an inner peripheral portion 23a of the diaphragm 23 are fluid-tightly fitted within a stepped portion of the hub 21. An outer peripheral portion 23b of the diaphragm 23 which is located at a rear side of the plate 22 is fluid-tightly held between a stepped portion of the rear shell 12 and a rear end portion of the front shell 11.

The valve 30, for establishing fluid communication between the variable-pressure chamber R2 and either the constant pressure chamber R1 or the atmosphere, includes a valve plunger 31 and a cylindrical valve 32.

The valve plunger 31 is mounted on an end portion of a push rod 40 or an input rod which is movable in the axial direction in response to a depressing or releasing movement of a brake pedal (not shown) and is slidably fitted for movement in the axial direction within the hub 21. For preventing separation of the valve plunger 31 from the hub 21, a key member 50 is employed. The cylindrical valve 32 is assembled within a cylinder portion 21a of the hub 21 and is continually urged in the frontward direction, i.e., in the direction of the chamber R1, by a spring 33, so that the cylindrical valve 32 is engagable with either a rear end portion of the valve plunger 31 or an inner stepped portion 21b of the hub 21.

Before the brake pedal is depressed, the cylindrical valve 32 is in engagement with a rear end of the valve plunger 31 and is out of engagement with the inner stepped portion 21b. Thus, fluid communication between the constant pressure chamber R1 and the variable-pressure chamber R2 is established through a hole or opening 21c of the hub 21, the cylinder portion 21a and a hole or opening 21d in the cylinder portion 21a. On the other hand, after the brake pedal has been depressed, but before the brake pedal is released, the cylindrical valve 32 is out of engagement with the rear end of the valve plunger 31 and is in engagement with the inner stepped portion 21b. Accordingly, the variable-pressure chamber R2 is in fluid communication with atmosphere or ambient air through the hole or opening 21d, the cylinder portion 21a, the inner hole or opening of the cylinder valve 32, air-filter A and an aperture 41a of a boot 41 provided between the housing 10 and the push rod 40.

In this embodiment, the key 50 which is in its illustrated position in FIG. 1 is in abutment with the rear shell 12 for regulating the positions of the hub 21 and the valve plunger 31, whereby the cylinder valve 32 is in engagement with the rear end portion of the valve plunger 31 and the inner stepped portion 21b. It is noted that the existence of a slight clearance between the inner stepped portion 21b and the cylinder valve 32 is allowed or permitted. Thus, upon frontward movement of the push rod 40 against the spring 42, immediate fluid communication is established between the variable-pressure chamber R2 and atmosphere.

At a front end portion of the power piston 20, an operating rod or output rod 70 is in engagement with a piston (not shown) of the master cylinder. A sealing member 16 is provided between the rod and the chamber R1. Within a recess of the operating rod 70, formed at a rear end portion thereof, a rubber disk 60 is disposed. A spring 80 continually urges the power piston 20 in the rearward direction, i.e., in the direction of the rod 40, via a retainer 81 and the biassing force also holds the operating rod 70 between the retainer 81 and the power piston 20.

In this embodiment, the hub 21 is divided into two members: a front hub 21A and a rear hub 21B both of which are fixed together by a plate 22. The valve plunger 31 also comprises two members: a front plunger 31A and a rear plunger 31B in such a manner that one is movable, relatively to the other. Between the hub 21 and the front plunger 31A a wall portion 90 is provided.

The wall portion 90 includes a plate 91 and a diaphragm 92. At a front side of the wall 90, there is defined an auxiliary pressure chamber R3 to which the pressure in the constant-pressure chamber R1 is continually supplied through an aperture 21e. At a rear side of the wall 90, there is defined an auxiliary pressure chamber R4 which is in fluid communication with the variable-pressure chamber R2 through a restricted orifice passage 21f. The plate 91 and the inner peripheral portion of the diaphragm 92 are held within the stepped portion of the front plunger 31A. The diaphragm 92, which is at a rear side of the plate 91, is fluid tightly held at its outer peripheral portion between the front hub 21A and the rear hub 21B.

In this embodiment, a check-valve 93 is provided at an outer periphery of the rear plunger 31B for quick discharge of the pressure from the pressure chamber R4 to the chamber R2 upon release of the brake pedal (not shown).

In operation, the brake pedal is depressed by the driver of the vehicle, and an operating or input force is applied to the push rod 40 in the frontward direction which corresponds to the left direction in FIG. 1. Then, due to the activation of the valve mechanism 30, pressure in the variable-pressure chamber R2 is increased (i.e., the pressure becomes positive upon being communicated with the atmosphere) which augments the frontward movement of the push rod 40. Simultaneously, the resulting pressure increase is transmitted or applied to the pressure chamber R4 after a time-lag or delay which depends upon the size of the orifice passage 21F, thereby moving the inner peripheral portion of the wall 90 toward the constant pressure chamber R1 with respect to the outer peripheral portion of the wall 90.

Figure 2:
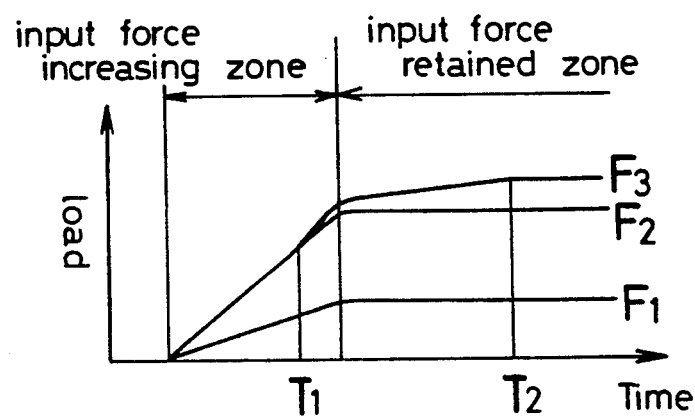
FIG. 2 Is a graph showing the characteristics of input and output forces with respect to time.

At the initial stage of the braking operation as shown in FIG. 2, an output load F3 is transmitted to the operation rod 70 in increased in proportion relative to an input load F1 which is the force applied to the push rod 40. At the later stage of the braking operation, after a time T1, the front plunger 31A is pushed in the frontward direction in accordance with the pressure increase in the pressure chamber R4, and the rear plunger and the push rod 40 are moved in the frontward direction, thereby actuating the valve mechanism 30. Due to the resulting actuation of the valve 30, the power piston 20 is brought into its outputting movement with the result that the output load F3 is increased relative to the pressure increase of the input load F1. Such operation is continued until the pressure in the pressure chamber R4 becomes equal to the pressure in the variable-pressure chamber R2 at the time T2 shown in FIG. 2. After the resulting equalization in pressure, the forces applied to the wall 90 are balanced, whereby the frontward movement of the front plunger 31A and the increase of the output load F3 are stopped.

Consequently, in the later stage of the braking operation, the pressure increase of the output load F3 can be obtained without increasing the input load F1. This operation results in an increase in the driver's feeling as to the reliability and operation of the braking system.

In addition, the foregoing booster can be combined with a brake pad which is designed to be small and large in its frictional coefficient in the initial and the later stages in the braking operation, respectively, which results in ideal braking operation without squel while still providing sufficient braking force.

Figure 3:
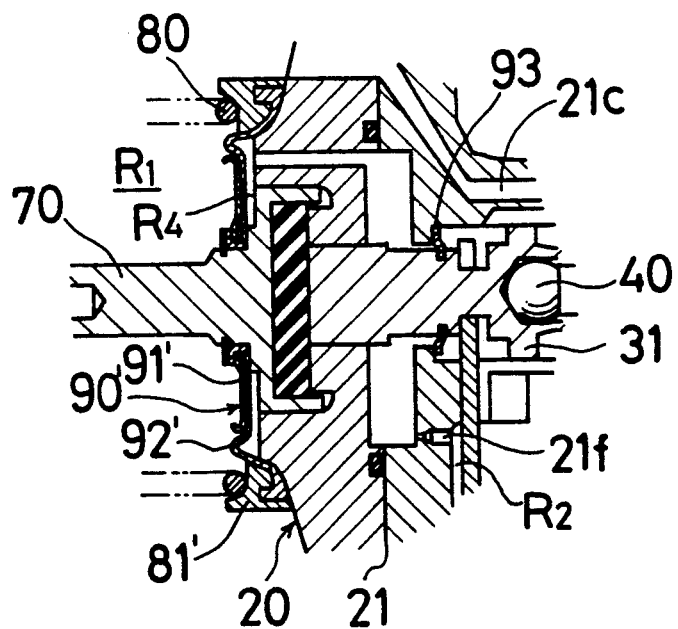
FIG. 3 is a cross-sectional view of a major portion of a booster according to another embodiment of the present invention.

Referring to FIG. 3, a major portion of another embodiment according to the present invention is disclosed. In this embodiment, a wall member 90 is disposed between an operation rod 70 and a hub 21. The wall 90' includes a plate 91' and a diaphragm 92'. The wall 90' is, at its front end portion, exposed directly to a constant-pressure chamber R1 and at a rear side of the wall 90' there is defined a pressure chamber R4 which is in fluid communication with a variable pressure chamber R2 through a restricted orifice passage 21f in a hub 21. An inner periphery of the plate 91' and an inner periphery of the diaphragm 92' are fluid-tightly mounted in a recess of the operating rod 70. An outer periphery of the diaphragm 92' which is at a rear side of the plate 91' is fluid-tightly held between the hub 21 and a retainer 81'. The remaining structure of this embodiment is not further described since it is similar or identical to that of the foregoing embodiment.

In the embodiment of FIG. 3, the supply of atmospheric pressure into the pressure chamber R4 causes axial movement of the outer periphery of the wall 90' relative to its inner periphery toward the constant-pressure chamber R1, thereby moving the operating rod 70, the plunger 31 and the push rod 40 in the frontward direction. Thus, due to the actuation of a valve 30, the power piston 20 is moved to its output side or the master cylinder in such a manner that the degree of the increase of the output load F3 is larger than that of the input load F1. The remaining operation of this embodiment is not further described since it is similar or identical to that of the foregoing embodiment.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A brake booster, comprising:
   a power piston;
   a housing in which constant-pressure chamber means and a variable pressure chamber are defined at least partially by the power piston;
   an input rod operatively connected to one end of the power piston and receiving an input force;
   valve means provided in the power piston and operatively connected to one end of the input piston for opening in response to the input force to cause the pressure in the variable pressure chamber to increase relative to the pressure in the constant pressure chamber means, whereby a resulting pressure differential therebetween moves the power piston;
   an output rod operatively connected to the other end of the power piston for transmitting an output force;
   a first auxiliary chamber separated from the constant pressure chamber means by a wall member; and
   orifice means for connecting the variable-pressure chamber to the first auxiliary chamber to cause the pressure in the first auxiliary chamber to increase relative to the pressure in the constant pressure chamber means in response to the opening of the valve means, so that a resulting pressure differential therebetween increases the output force;
   the orifice means including a restriction imposing a time delay between the increased pressurizations of the variable pressure chamber and the first auxiliary chamber.

2. A booster according to claim 1, further comprising check-valve means situated between said variable pressure chamber and said first auxiliary chamber for reclaiming the pressure in the first auxiliary chamber to the variable-pressure chamber upon release of the input force.

3. A booster according to claim 1, wherein the wall member is flexible, an outer periphery of the wall member is operably connected to the power piston, and an inner periphery of the wall member is operably connected to the output rod.

4. A booster according to claim 1, wherein the constant-pressure chamber means includes a constant-pressure chamber and a second auxiliary chamber, the second auxiliary chamber opposing the first auxiliary chamber.

5. A brake booster, comprising:
   a power piston;
   a housing in which constant-pressure chamber means and a variable pressure chamber are defined at least partially by the power piston;
   an input rod operatively connected to one end of the power piston and receiving an input force;
   valve means provided in the power piston and operatively connected to one end of the input piston for opening in response to the input force to cause the pressure in the variable pressure chamber to increase relative to the pressure in the constant pressure chamber means, whereby a resulting pressure differential therebetween moves the power piston;
   an output rod operatively connected to the other end of the power piston for transmitting an output force;
   a first auxiliary chamber separated from the constant pressure chamber means by a wall member;
   orifice means for connecting the variable-pressure chamber to the first auxiliary chamber to cause the pressure in the first auxiliary chamber to increase relative to the pressure in the constant pressure chamber means in response to the opening of the valve means, so that a resulting pressure differential therebetween increases the output force;
   the orifice means including means imposing a time delay between the increased pressurizations of the variable pressure chamber and the first auxiliary chamber; and
   check-valve means situated between said variable pressure chamber and said first auxiliary chamber for reclaiming the pressure in the first auxiliary chamber to the variable-pressure chamber upon release of the input force.

* * * * *